June 14, 1960   R. H. POSTAL   2,941,192
FLAME AND OVERHEAT DETECTING SYSTEM
Filed Sept. 20, 1957
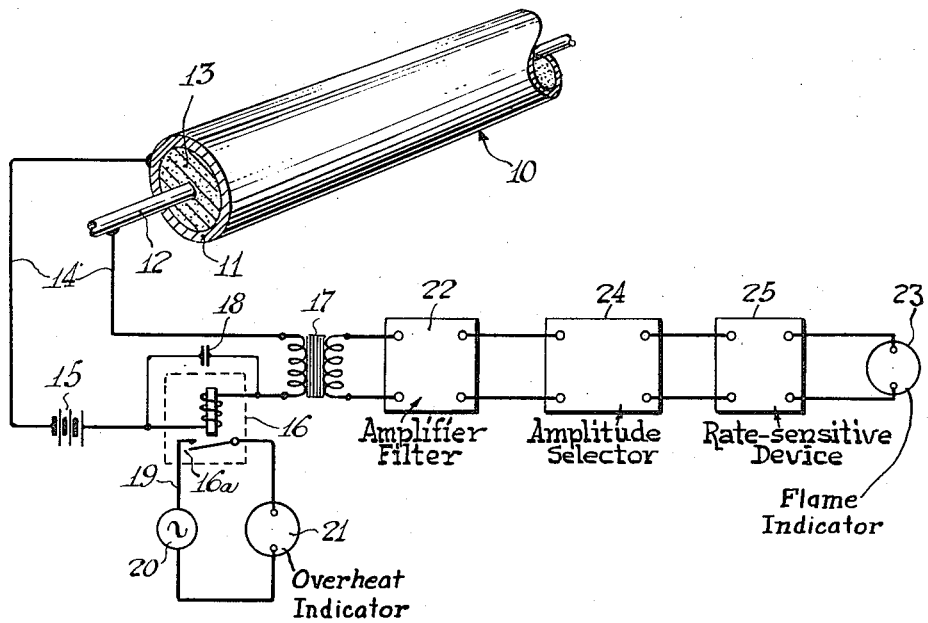
INVENTOR
Robert H. Postal United States Patent Office 2,941,192
Patented June 14, 1960

2,941,192

FLAME AND OVERHEAT DETECTING SYSTEM

Robert H. Postal, Clifton, N.J., assignor to McGraw-Edison Company, Elgin, Ill., a corporation of Delaware Filed Sept. 20, 1957, Ser. No. 685,302

2 Claims. (Cl. 340—228)

This invention relates to a novel system for flame detection and particularly to a combined form of flame and overheat detecting system utilizing a single sensing device.

It is an object to provide an improved fire detecting system which is capable of distinguishing between a moderate overheat condition throughout a given space or a localized fire within that space.

It is another object to provide an improved fire and overheat detecting system which is adapted to provide one indication responsive to an overheat condition and another indication when there is also present some actual flame.

Features of the invention are in providing a cable form of sensing device which is differently responsive to overheat and flame conditions, and in connecting a single electrical receiving circuit to such cable which includes separate indicating devices differently responsive to the sensing device according to whether the latter is subjected to overheat or flame conditions.

The invention resides particularly in the discovery that fire detector cables of the type employing a protective metal sheath with a center wire and intervening semiconductive metal oxide are capable of responding in one sense to an overheat condition and in another sense to flame flicker. Such cables have been employed for overheat detection as described, for example, in my joint patent with Frederick G. Kelly No. 2,740,874, dated April 3, 1956. When used for overheat detection this cable is employed as a temperature-responsive resistance device for controlling directly the current from a direct-current source to a control relay or alarm device. The rate of this response depends on the thermal mass of the cable per unit length, and is not critical for overheat detection since it is readily feasible to build cables to respond to temperature variations up to about ¼ c.p.s. by suitably reducing the cross sectional dimensions of the cable. Such cable constitutes also a sensing device for detecting the presence of flame since the metal sheath and semiconductor cooperate to form an efficient thermocouple having a cyclic thermoelectric voltage output responsive to the flame flicker. It is well known that flames in air are characterized by a flicker, by which is meant that the upper luminous portion of the flame varies between a frequency range of from 2 to 30 c.p.s. with the predominant flicker components being in the subaudio range below about 15 c.p.s. Cables of the character here mentioned are capable of detecting flame flicker in this subaudio range because their rate of thermoelectric response is dependent only on the thermal mass of the sheath and adjacent outer layer of the semiconductor instead of on the entire thermal mass of the cable.

It is a further object of my invention to provide a simplified overheat and flame detecting system which takes advantage of the combined overheat and flame sensing properties of the cable above described.

A still further object is to provide a combined detecting system wherein detection of overheat and flame is distinguished as between whether the electrical output is D.C. or A.C.

These and other objects and features of my invention will be apparent from the following description and the appended claims.

In the description of my invention reference is had to the accompanying schematic circuit diagram illustrating my invention.

Continuous fire detector cables of the temperature-responsive resistance type have now come into common use for detecting fires, especially on aircraft. This fire detector cable is typically provided in lengths up to 100' for distribution throughout the space to be monitored. In accordance with the teaching of the patent aforementioned, cables using an electronic semiconductive oxide as the temperature-responsive filler have a sufficient sensitivity to enable direct control of the alarm or alarm-control relay without the need for any amplifying means. However, in this equipment the threshold current at which the alarm apparatus is adapted to operate can be obtained either by a moderate heating of the cable throughout its full length or by an intense localized heating as by flame over only a short length. The possibility of either of these conditions arising in modern aircraft is a common one, giving rise therefore to the need for a fire detecting apparatus which is capable of distinguishing between overheat and flame conditions.

The present invention uses a fire detector cable 10 (only fractionally shown) which may be of the general form described in the aforementioned patent and which may also include the improvements described in my pending application Serial No. 392,565, filed November 17, 1953, now Patent No. 2,848,587 issued August 19, 1958. Such cable has an exterior protective metal sheath 11 of nickel-iron or Inconel (for example, 77% Ni, 15% Cr, 7% Fe, 25% Mn), a center wire 12 as of copper-clad nickel-iron (known as Dumet wire), pure iron or other metals which are oxidizable to form semiconductive oxides, and a temperature-responsive electronic semiconductive filler material 13 between the sheath and center wire which is essentially an insulator at low temperatures and a conductor at overheat or flame temperatures. Such semiconductive materials may comprise the p type semiconductors including the oxides of Co, Mn, Ni, Cr and Cu, the n type semiconductors including the oxides of Ti, Fe, Ba, etc., as well as mixtures thereof as disclosed in the patent and application aforementioned. This semiconductive material is packed in the cable under high pressure both so as to provide good electrical contact of the center wire and sheath and to drive out all free air space, and the cable is then sealed and heated to sinter the semiconductive material so as to provide the surfaces of the center wire and cable contacting the semiconductor with a stabilized oxidized surface layer as well as to reduce the oxygen content of the semiconductor to the level for the resistivity desired. Alternatively, the semiconductor may be a lithium-doped manganese oxide which is dependent on its lithium content for its resistivity, as described in my Patent 2,764,659 dated September 25, 1956. For details as to further mechanical and operating features, as well as different fabricating techniques in producing these cables, reference may be had to the patents and application aforementioned.

The resistivity of the semiconductor varies inversely according to the average temperature of the ambient in which the cable is immersed. This characteristic of the cable enables it to be used in series with a potential source and alarm device to cause the latter to be operated by the increased flow of current in the circuit when the cable is subjected to an overheat condition.

It has been found that these fire detector cables have a further characteristic response in that the metal sheath and semiconductor cooperate to form a thermocouple of high thermoelectric efficiency in which the so-called "hot" junction is that between the semiconductor and outside sheath and the "cold" junction is that between the semiconductor and the inside center wire. Since this hot junction is closely thermally associated with any flame directed onto the cable and has a low thermal mass dependent only on the sheath and adjacent filler of the semiconductor, it is capable of following temperature variations at a rapid rate—so much so that when the cable is immersed in a flame it will provide an A.C. thermoelectric voltage output in correspondence with the flame flicker up to frequencies as high as 15 c.p.s., which is the range comprising the predominant flicker components of flames. On the other hand, the inner cold junction between the semiconductor and center wire will be at a lower temperature than that of the outer hot junction because of its less direct exposure to the flame and will tend to follow only an average temperature of the flame because of the greater thermal mass associated therewith. In a typical case wherein there is used a cable having an outside diameter of .070", a sheath with a wall thickness of .012" and a center wire with a diameter of .020", the temperature differential across the semiconductor when the cable is immersed in a flame varies cyclically from 1 to 3° C. This cable has such thermoelectric efficiency that it produces a voltage between the sheath and semiconductor of the order of 1 mv. per degree C.—which is an efficiency about twenty times greater than that of metallic thermocouple materials. This thermoelectric voltage can be tapped off from the center wire and sheath because the semiconductor is heated uniformly enough to provide a low-resistance connection between the center wire and sheath. Even though the cold junction is in this case isolated from the impinging flame only by the thickness of the semiconductor, a thermoelectric voltage output is obtained which is still of the order of ten times that typically obtained from commercial point type metal-to-metal thermocouples.

In the accompanying drawing there is shown a receiving circuit 14 connected between the sheath and center wire which includes a battery 15, coil of a sensitive relay 16 and primary winding of a transformer 17. The sensitive relay 16 responds to the direct current in the receiving circuit produced in response to the lowering resistivity of the semiconductor of the cable when the cable is subjected to an overheat condition, it being understood that the relay is set to operate at a threshold current which occurs when the cable reaches a certain condition of overheat. Such relay may be, for example, of the rotary polarized-magnet type disclosed in Clark Patent No. 2,473,938 dated June 21, 1949. A condenser 18 may be connected in shunt with the coil of the relay for by-passing the A.C. current components in the receiving circuit arising from the presence of flame, as will appear. The relay 16 has a pair of contacts 16a connected in an alarm circuit 19 which serially includes a suitable power source 20 and indicating or alarm device 21.

The transformer 17 passes the cyclical current components in the receiving circuit 14 produced by the thermoelectric E.M.F. generated between the semiconductor and sheath 11 in response to flame flicker. The secondary winding of this transformer is connected through an amplifier-filter 22 having a low-pass characteristic adapted to pass frequencies up to about 15 c.p.s. The output of the amplifier-filter 22 is connected to an A.C. receiving device 23 which may comprise a relay controlling a suitable indicating or alarm device. However, there is preferably serially included in the circuit ahead of the receiving device an amplitude selector 24 set to pass only currents exceeding a given threshold, and an integrating or rate-sensitive circuit 25 which will pass only signals continuing for some predetermined duration as, for example, only signals of say 3 or more cycles occurring within a period of 1 second. The amplitude selector 24 is desirable for the purpose of eliminating sub-level cyclic components such as of noise or hum from reaching the receiving device, and the integrating circuit 25 is desirable for preventing random short-duration signals or signals due to slow overheat variations from reaching the receiving device. Any operation of the A.C. receiving device is therefore a positive indication of the presence of flame or of hot, turbulent gases from a flame. The devices 24 and 25 may be of conventional design such, for example as shown, by Norton Patent No. 2,709,799, dated May 31, 1955.

As a modification of the invention, the cable 10 may be of the thermocouple type disclosed in my pending application Serial No. 518,253, filed June 27, 1955 and entitled Cable Type Thermocouple and Circuit, now Patent 2,805,272, issued September 3, 1957. In such cable the center wire 12 is made of a metal dissimilar from that of the sheath so that a thermoelectric voltage is developed between the center wire and sheath at whatever point the cable is heated sufficiently to cause the semiconductor to provide a low-resistance connection, or hot junction, between the sheath and center wire, it being understood that the cold junctions in this case are outside the heated zone where the terminal connections are made between the cable and the receiving circuit 14. This D.C. thermoelectric voltage which occurs in response to overheat conditions is superimposed on the cyclic thermoelectric voltage generated between the sheath and semiconductor responsive to flame flicker. The advantage of this combined form of overheat and flame detector cable is that it requires no external power source such as the battery 15 in the signal circuit 14 since the cable generates its own signal voltages responsive to both overheat and flame conditions.

The particular embodiment of my invention herein described is intended to be illustrative and not necessarily limitative of the invention since the same is subject to changes and modifications without departure from the scope of my invention, which I endeavor to express according to the following claims.

I claim:

1. A combined flame-sensitive and overheat detector comprising a sensing cable having an outer metallic sheath, a spaced metallic center wire and an intervening semi-conductive material in electrical contact with both said sheath and center wire and forming a thermocouple between said semiconductor and said sheath, said semi-conductive material being essentially an insulator at low temperatures and a conductor at flame temperatures, said sheath having a low mass per unit length enabling it in conjunction with said semiconductive material to provide an A.C. thermoelectric voltage between said center wire and sheath at a sub-audio frequency responsive to flame flicker when flame impinges on said sheath, a D.C. type indicating system connected between said center wire and sheath including a D.C. source of voltage and a D.C. instrument responsive to flow of direct current from said source through said cable when the cable is heated to cause said semiconductive material to be conductive, and an A.C. type indicating system connected also between said center wire and sheath for providing an indication responsive only to the A.C. thermoelectric voltage between said center wire and sheath when said cable is impinged upon by a flame.

2. A combined flame-sensitive and overheat detector comprising a sensing cable having an outer metallic sheath, a spaced metallic center wire and an intervening semi-conductive material in electrical contact with both said sheath and center wire and forming a thermocouple between said semiconductor and said sheath, said semi-conductive material being essentially an insulator at low temperatures and a conductor at flame temperatures, said sheath having a low mass per unit length enabling it in conjunction with said semiconductive material to provide an A.C. thermoelectric voltage between said center wire and sheath at a sub-audio frequency responsive to flame flicker when flame impinges on said sheath, said sheath and center wire being of dissimilar metals having thermoelectric properties causing a steady D.C. thermoelectric voltage to be generated thereby when said semiconductive material is heated to form an effective hot junction between the sheath and center wire, a D.C. type indicating system connected between said sheath and center wire responsive to the steady D.C. thermoelectric voltage generated by said cable when any portion thereof is subjected to an overheat condition causing said center conductor to form an effective hot junction between the sheath and center wire, and an A.C. type indicating system connected between said center wire and sheath and responsive only to the flicker induced A.C. thermoelectric voltage generated by said cable when the cable is impinged upon by a flame.

References Cited in the file of this patent
UNITED STATES PATENTS

| | | |
|---|---|---|
| 2,764,659 | Postal | Sept. 25, 1956 |
| 2,805,272 | Postal | Sept. 3, 1957 |
| 2,834,008 | Carbauh | May 6, 1958 |

OTHER REFERENCES

Publication: Electrical Engineering, July 1947, p. 642 relied on.